Figure 1:
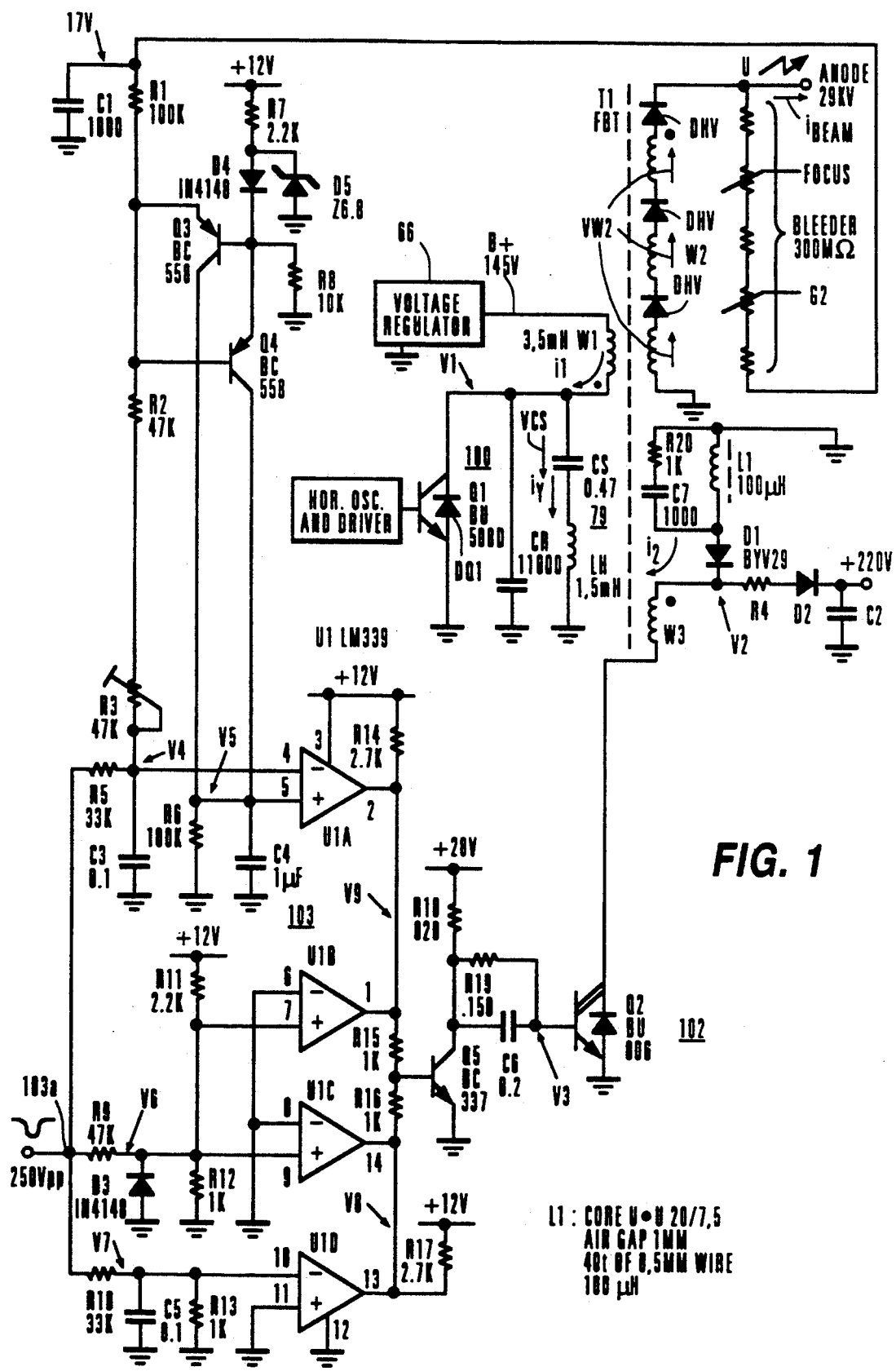

United States Patent [19]
Haferl

[11] Patent Number: 5,266,871
[45] Date of Patent: Nov. 30, 1993

[54] HIGH VOLTAGE STABILIZATION CIRCUIT FOR VIDEO DISPLAY APPARATUS

[75] Inventor: Peter E. Haferl, Adliswil, Switzerland

[73] Assignee: RCA Thomson Licensing Corporation, Princeton, N.J.

[21] Appl. No.: 843,341

[22] Filed: Feb. 28, 1992

[30] Foreign Application Priority Data

Jan. 7, 1991 [GB] United Kingdom ............... 9114168

[51] Int. Cl.[5] .................................... H01J 29/70
[52] U.S. Cl. .................................... 315/411; 358/190
[58] Field of Search .................. 315/411, 408; 358/190

[56] References Cited

U.S. PATENT DOCUMENTS 4,761,587 8/1988 Wharton ..................... 315/408

Primary Examiner—Theodore M. Blum
Attorney, Agent, or Firm—Joseph S. Tripoli; Joseph J. Laks; Sammy S. Henig

[57] ABSTRACT

In a television receiver, an ultor accelerating potential or high voltage for a picture tube is derived by rectifying a retrace pulse voltage developed in a high voltage winding of a flyback transformer. The retrace pulse voltage is developed by a horizontal deflection circuit output stage that is coupled to the high voltage winding via a primary winding of the flyback transformer. The horizontal deflection circuit output stage includes a horizontal deflection winding, a retrace capacitor and a trace switch. The trace switch includes a damper diode and a horizontal output transistor. An energy storage coil is coupled in parallel with a third winding of the flyback transformer during a controllable time interval beginning during the second half of horizontal trace and ending during retrace. The energy stored in the coil during the trace portion is transferred to the flyback transformer during retrace to enhance high voltage at high beam currents. The amount of energy is controlled or regulated to obtain a stabilized high voltage. The energy storage coil is parallel coupled to a retrace resonant circuit during the energy transfer interval and thus stabilizers also the horizontal retrace time which might have otherwise increased with increasing beam current.

16 Claims, 4 Drawing Sheets

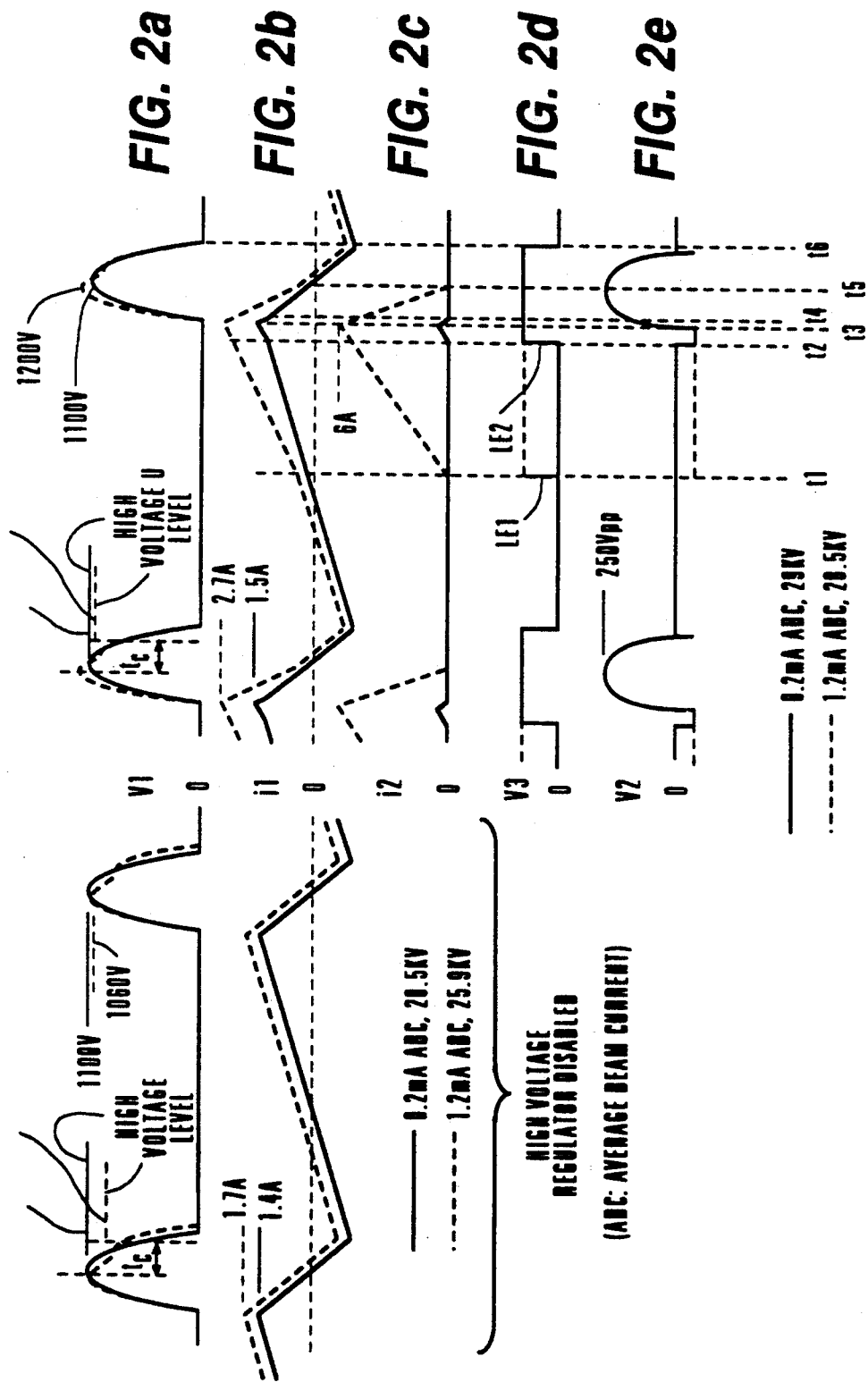

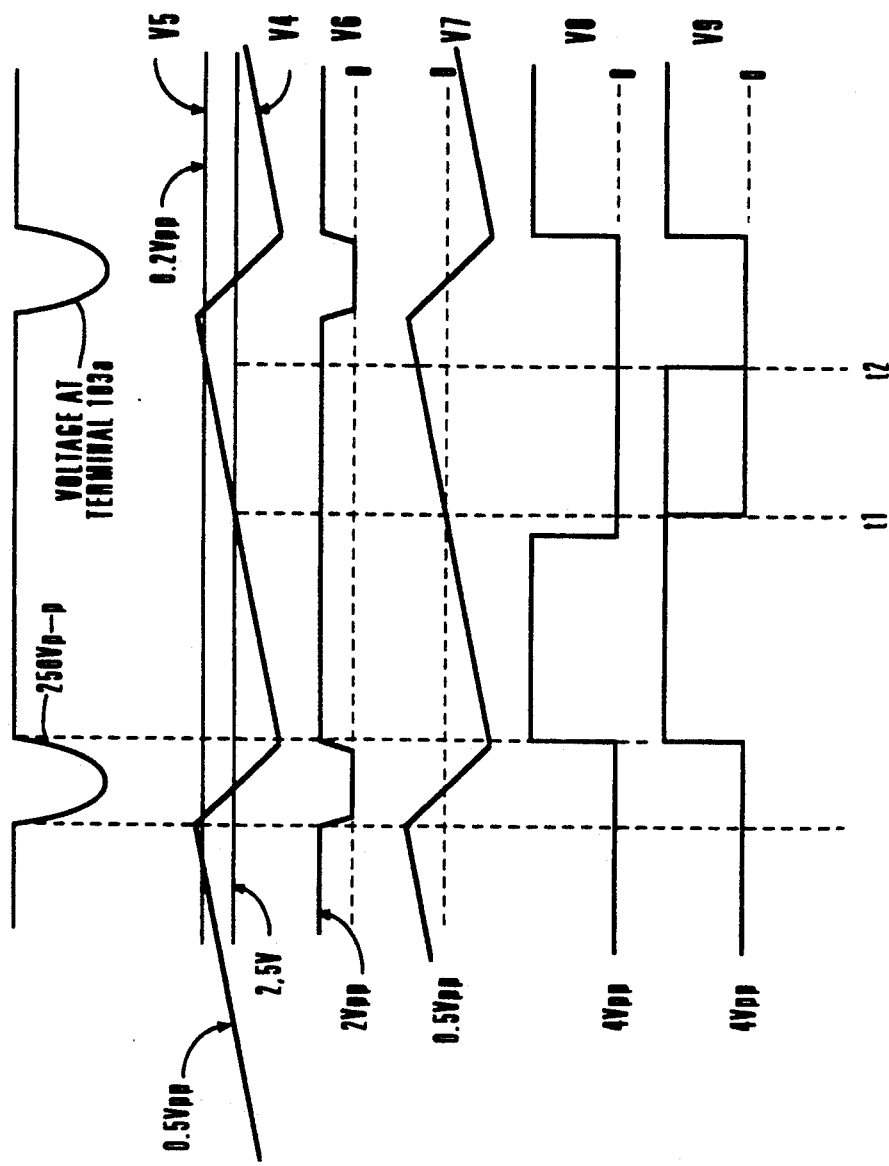

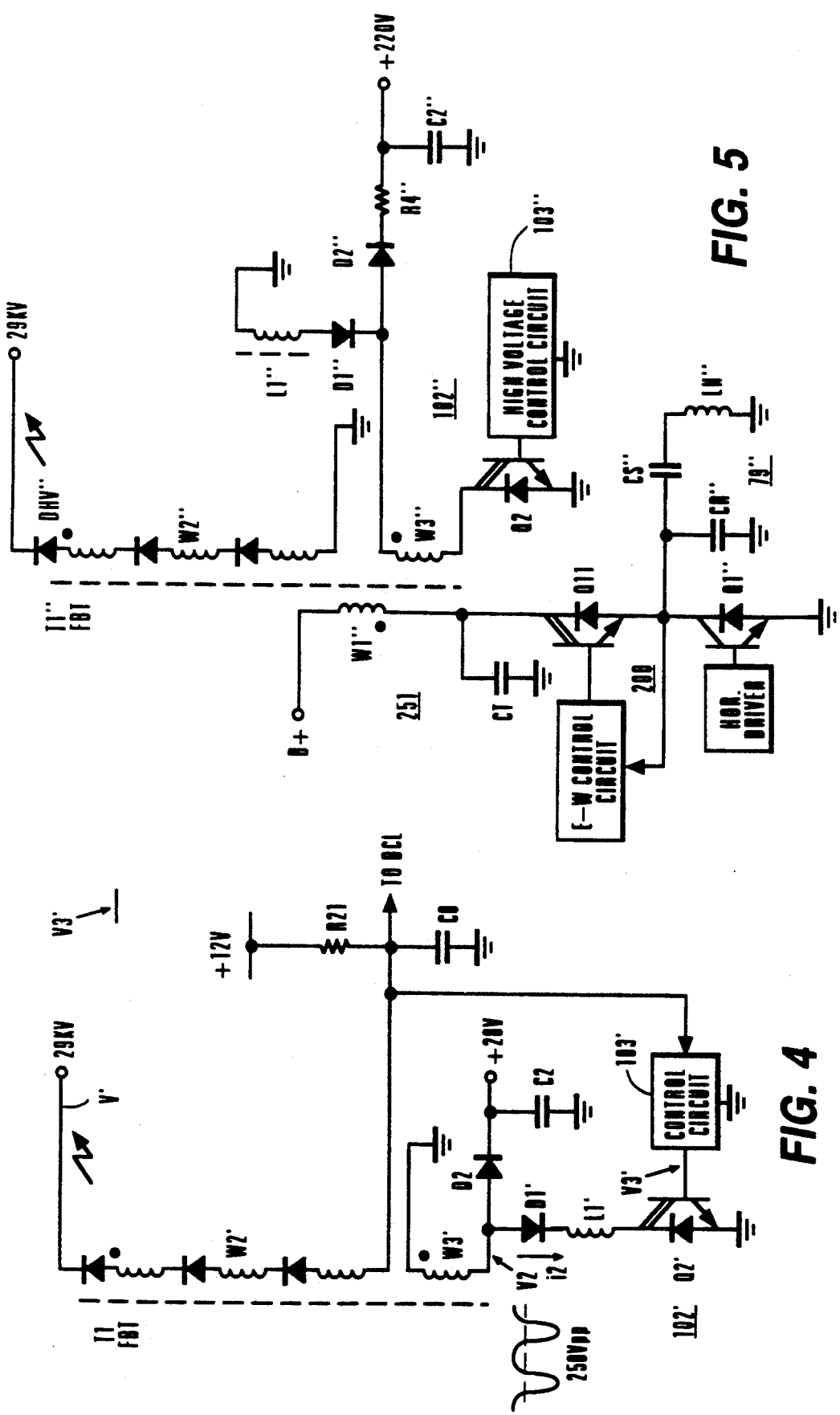

HIGH VOLTAGE STABILIZATION CIRCUIT FOR VIDEO DISPLAY APPARATUS

This invention relates to a power supply for a television apparatus with high voltage stabilization In television receiver or monitor circuits, the ultor accelerating potential or high voltage for a picture tube is, typically, derived by rectifying a retrace pulse voltage developed in a high voltage winding of a horizontal output flyback transformer. The retrace pulse voltage is developed by a horizontal deflection circuit output stage that is coupled to the high voltage winding via a primary winding of the flyback transformer. The horizontal deflection circuit output stage comprises a horizontal deflection winding, a retrace capacitor and a trace switch, comprising a damper diode and a horizontal output transistor.

In typical television receiver circuits, raster size is inversely proportional to the square root of the ultor accelerating potential. Because the high voltage circuit exhibits a certain amount of source impedance, increasing the load current drawn from the ultor terminal will result in a decreased ultor accelerating potential. Ultor voltage variations resulting from variation of beam current occur mainly due to a leakage inductance between the high voltage and the primary winding of the flyback transformer. Ultor voltage variations may lead to reduced performance. The reduced performance is manifested by undesirable raster size variations, reduced peak brightness and poor focus at high beam currents.

The inner and outer aquadag of the picture tube act as a capacitance that is charged by flyback transformer current, during retrace, and is discharged by the beam current. Increasing beam current requires increasing charge current, during retrace. This leads to increased loading of the deflection retrace circuit that includes a deflection winding, causing an increased retrace time width and reduced retrace or flyback voltage pulse amplitude. The result is a further reduction of performance because of "S" shaping variation due to retrace time width variation as a function of the beam current.

The introduction of very large picture tubes and in particular the introductin of the 16:9 aspect ratio picture tubes may require improved performance of the high voltage and deflection circuits. For example, the display of a 4:3 picture on a 16:9 picture tube will show the left and right hand picture borders. Any display breathing or deflection disturbance due to retrace voltage amplitude and/or width variation may be visible because the masking overscan is missing. It may be desirable to improve stability of high voltage and retrace width with beam current variation.

In accordance with an aspect of the invention, an energy storage coil is coupled in parallel with a winding of a flyback transformer during a controllable time interval beginning during the second half of horizontal trace and ending during retrace. The energy stored in the coil during the trace portion is transferred to the flyback transformer during retrace to enhance high voltage at high beam currents. The amount of energy is controlled or regulated to obtain a stabilized high voltage.

In accordance with another aspect of the invention, the energy storage coil is parallel coupled to a retrace resonant circuit during the energy transfer interval and thus stabilizes also the horizontal retrace time which might have otherwise increased with increasing beam current.

A regulated power supply embodying a further aspect of the invention, includes a retrace resonant circuit that includes a deflection winding. A deflection current is generated in the deflection winding, during a deflection cycle and a first pulse is generated in a first winding of a flyback transformer, during retrace. A pulse-modulator is responsive to a control signal for generating a pulse-width-modulated signal that is modulated in accordance with the control signal. A switching arrangement generates a second pulse in the second winding, during retrace, that is modulated in accordance with the modulated signal. Both the first and second pulses are transformer-coupled to a load circuit via the transformer for generating one of a regulated load voltage and a regulated load current in the load circuit.

FIG. 1 illustrates a horizontal deflection circuit with ultor voltage regulation circuit with ultor voltage sensing, embodying an aspect of the invention;

FIGS. $2a$–$2e$ and $3a$–$3f$ illustrate waveforms useful for explaining the operation of the circuit of FIG. 1;

FIG. 4 illustrates a second embodiment of the invention in which an ultor voltage regulation circuit senses directly a transformer current; and FIG. 5 illustrates a third embodiment of the invention that includes a raster distortion correction circuit.

FIG. 1 illustrates a horizontal deflection circuit 100 and a high voltage stabilization or regulator circuit 102, embodying an aspect of the invention, that generates a stabilized ultor voltage U. The arrangement of FIG. 1 may be used in conjunction with, for example, a 37" color picture tube, not shown, of the type Mitsubishi A89JKA81X. For simplicity, east-west raster correction, horizontal linearity correction and component values, which are not relevant for explaining the invention, are omitted from FIG. 1.

A switching transistor Q1 of deflection circuit 100, responsive to a horizontal rate drive signal, generates a horizontal rate retrace voltage V1. Voltage V1 is generated in a deflection retrace or flyback resonant circuit 79. Voltage V1 is coupled via a primary winding W1 of a flyback transformer T1 to a high voltage winding W2 to form a horizontal rate retrace or flyback high voltage VW2 in each winding portion of winding W2. Circuit 79 includes a deflection winding LH in which a deflection current iy is generated. Rectifying diodes, DHV, coupled in a diode-split configuration to the winding portions of winding W2, produce an ultor voltage U that is coupled to the anode of the picture tube, not shown.

FIGS. $2a$–$2e$ and $3a$–$3f$ illustrate waveforms useful for the explanation of the circuit of FIG. 1. Similar symbols and numerals in FIGS. 1, $2a$–$2e$ and $3a$–$3f$ indicate similar items or functions. The waveforms of FIGS. $2a$–$2e$ are drawn in solid lines for 0.2 mA average beam current beam and in broken lines for 1.2 mA average beam current.

The waveforms on the left hand side of FIGS. $2a$ and $2b$, referred to herein as left FIGS. $2a$ and $2b$, respectively, are used to explain the operation when high voltage regulator circuit 102 is disabled. In this case, retrace voltage V1 of FIG. 1 decreases at high beam current, as shown in broken line, and the retrace time tends to increase. An interval tc indicates the conduction interval of high voltage rectifying diodes DHV integrated in winding W2 of flyback transformer T1. Interval tc is negligibly small at low beam currents, as shown in left FIG. 2a, but increases at high beam currents because of the leakage inductance between windings W1 and W2 of FIG. 1. As a result, ultor voltage U decreases significantly from 28.5 to 25.9 KV. The high voltage level U is equal approximately to the retrace voltage at the center of interval tc, at left FIG. 2a. The slopes of a primary current i1 of left FIG. 2b are determined by a supply voltage B+ of FIG. 1 that is coupled to winding W1, the inductance of winding W1 and the retrace resonant frequency of circuit 79. Voltage B+ is coupled to the undotted terminal of winding W1. Voltage B+ is supplied by a voltage regulator 66.

A negative portion of current i1 representing recovered energy flows back to voltage regulator 66 that regulates voltage B+. Current i1 increases to a peak amplitude of 1.7 A at high beam current. The increase appears as an added D.C. component causing the negative portion of current i1 to decrease. When the negative peak of current i1 reaches zero, no energy is recovered and a damper diode DQ1, coupled in parallel with transistor Q1, cannot conduct. Excessive D.C. component may lead to an improper operation causing deflection distortions and a reduction of the high voltage.

In accordance with an inventive feature, high voltage regulator circuit 102 includes an energy storage coil or inductor L1, a diode D1 and a winding W3 of transformer T1 coupled in series with a collector-emitter current path of a switching transistor Q2 that is controlled by a control circuit 103. Diode D1 is conductive during a controllable portion of trace. A snubber network that includes a capacitor C7 and a resistor R20 across coil L1 prevents excessive ringing when diode D1 cuts-off during the retrace interval. The waveforms of right FIGS. 2a-2e are used for explaining the normal operation of high voltage regulator circuit 102. Advantageously, winding W3 of FIG. 1 is also employed in a retrace voltage power supply that includes a rectifier D2, a current limiting resistor R4 and a filter capacitor C2 to obtain a supply voltage in capacitor C2 for energizing video output amplifiers, not shown.

A high voltage representative voltage is developed at the emitter of transistor Q3 that is coupled to a voltage divider. The voltage divider includes a resistor R.1 and a bleeder resistor BLEEDER. A control circuit 103 generates a base drive voltage V3 of transistor Q2, having a waveform of FIG. 2d. A leading edge LE of voltage V3, that causes transistor Q2 to begin conducting is phase-modulated in accordance with the voltage across resistor R1, in an interval t1-t2 that occurs during trace. The voltage across resistor R1 varies when ultor voltage U varies. Transistor Q2 of FIG. 1 conducts at low beam current or at high ultor voltage U, during an interval t2-t6 of FIG. 2d, as shown in solid line. Increasing beam current or a decrease in voltage U causes leading edge LE of voltage V3 to advance from time t2 toward time t1, as shown in broken line that corresponds to a 1.2 mA beam current. Transistor Q2 conducts during interval t1-t6 and clamps a voltage at an undotted terminal of winding W3 to ground potential. A negative trace voltage V2 of FIG. 2e at a dotted terminal of winding W3 produces an up-ramping current i2 of FIG. 2c that flows from ground through inductor L1, diode D1, winding W3 and transistor Q2.

Current i2 reaches its peak amplitude at time t3, the beginning of the retrace interval. Current i2 and the impedance of coil L1 are reflected in primary winding W1, according to the winding ratio of windings W3 and W1. Current i1 at right FIG. 2b increases at a higher rate than in left FIG. 2b, during interval t1-t3, because the transformer-coupled inductance of coil L1 reduces the inductance of primary winding W1. Current i1 reaches a higher peak value, shown in broken lines at right FIG. 2b, than at left FIG. 2b due to the transformer-coupled current i2 of FIG. 2c. The peak amplitude of current i2 at time t3 determines the stored energy in coil L1. By transformer coupling, the stored energy is also indicated by the difference of the peak amplitudes between current i1 in left FIG. 2b and current i1 in right FIG. 2b.

The magnetic energy in each of transformer T1, coil L1 and deflection winding LH is transferred as a retrace current flow into a capacitor CR of circuit 79 of FIG. 1 during the first half of the retrace interval to produce a retrace voltage V1 of right FIG. 2a. Current i2 flowing through winding W3 is a down-ramping current because of the positive retrace voltage V2 at the dotted terminal of winding W3. Current i2 reaches a zero level at time t5 of FIG. 2c. Diode D1 of FIG. 1 is then reverse biased by retrace voltage V2 and decouples coil L1 from winding W3. Thus, coil L1 is parallel-coupled to retrace circuit 79, as long as down-ramping current i2 flows.

A trace voltage VCS, developed across a trace capacitor CS that is coupled in series with deflection winding LH, has a D.C. voltage component that is equal to voltage B+. The D.C. voltage component of voltage VCS is substantially unaffected by variation of the conduction interval of transistor Q2 of circuit 102. Deflection current iy is regulated in accordance with the D.C. voltage component of voltage VCS that is determined by voltage B+. Voltage B+ is regulated independently of the operation of high voltage regulator circuit 102.

In accordance with an inventive feature, the negative feedback loop that includes circuit 102 regulates ultor voltage U without significantly affecting deflection current iy. Thus, a change in the peak amplitude of current i2 caused by a change in beam current loading does not affect current iy that is regulated separately by voltage B+.

In accordance with another inventive feature, the retrace frequency increases during current i2 conduction interval, t3-t5 of FIG. 2c, to compensate for retrace time modulation that is caused by beam current variations. Therefore, voltage V1 of right FIG. 2a increases faster at high beam current than at low beam current, as shown by the difference between the solid and broken lines. The additional energy transferred from coil L1 of FIG. 1 produces a higher peak amplitude of voltage V1 at high beam current than at low beam current. As a result, advantageously, the decrease in high voltage U is smaller at high beam current and the retrace time remains constant.

At high beam currents, the level of the high voltage U is approximately equal to an average value of pulse voltage V1, as shown in the broken line of FIG. 2a, that occurs during interval tc when rectifying diodes DHV of FIG. 1 are conductive. The average value of voltage V1 during interval tc is approximately equal to the peak value of voltage V1 at low beam current. The difference between voltage U at high and low beam currents at right FIG. 2a is, advantageously, much smaller when compared with that shown in left FIG. 2a.

Circuit 103 produces pulse-width-modulated voltage V3 that controls transistor Q2. In circuit 103, a low voltage end of bleeder resistor BLEEDER is coupled to a filter capacitor C1, and via, resistor R1, to an emitter of a transistor Q3. A biasing network that includes a resistor R7, a diode D4, a zener diode D5 and a resistor R8 provides a stable reference base voltage of transistor Q3 and an emitter voltage of a transistor Q4.

A bleeder current in resistor R1 is split into a greater portion that flows through a series arrangement of a resistor R2, a resistor R3, a resistor R5 and a flyback transformer winding, not shown, of transformer T1 to ground. That flyback winding in the current path of resistors R2, R3 and R5 generates a 250 Vpp negative going retrace pulse at a terminal 103a. For D.C. purposes, the voltage at terminal 103a represents ground potential. The retrace pulses at terminal 103a are integrated by an integration network that includes resistor R5 and a capacitor C3 to produce a sawtooth voltage V4.

The other, and smaller, portion of the bleeder current flows through transistor Q3 and through a beam current sampling load resistor R6. A high voltage representative voltage V5 developed across resistor R6 is filtered by a capacitor C4. Whereas, voltage V4 across resistor R5 is not modulated by high voltage variations because the emitter of transistor Q3 is at a constant D.C. potential. Voltage V5 varies with ultor voltage variations, as shown in FIG. 3b. Advantageously, the current that flows through resistors R2, R3 and R5 reduces the D.C. level of voltage V5, thus enabling the usage of a higher value resistor for resistor R6.

Voltage V4 is compared with voltage V5 by a voltage comparator U1A for modulating a trailing edge of voltage V9 during an interval t1-t2 of FIG. 3f. Comparators U1B and U1C of FIG. 1 are driven by retrace pulse voltage V6 to hold down output voltages V8 and V9 of comparators U1B and U1C, respectively, during retrace. A comparator U1D is driven by a sawtooth voltage V7 of FIG. 3d produced by an R-C network of a resistor R10 of FIG. 1 and a capacitor C5. Output voltage V8 prevents transistor Q2 from being turned on during the first half of the trace interval. Voltages V8 and V9 are summed via resistors R16 and R15 to drive a base of a transistor Q5. Transistor Q5 produces, at its collector, voltage V3 that is also developed at the base of transistor Q2. High voltage U is adjusted by a variable resistor R3 which varies in a differential manner the D.C. levels of voltages V4 and V5.

Transistor Q4 provides protection by disabling circuit 103 and transistor Q2. When the bleeder current falls below approximately 70% of its nominal value, transistor Q3 becomes disable or nonconductive and transistor Q4 becomes conductive. The current flowing through resistor R7, diode D4 and transistor Q4 charges capacitor C4 to a higher voltage than voltage V4, causing the sum of voltages V8 and V9 to be positive during trace. As a result, transistor Q2 cannot conduct during trace and current i2 is zero. Such fault condition can occur with a defective or disconnected bleeder resistor. Advantageously, the protection operation provides a soft start-up operation because the high voltage regulator is disabled until high voltage U is equal to at least 70% of its nominal value.

FIG. 4 illustrates a high voltage regulator 102', embodying another aspect of the invention. Similar symbols and numerals in FIGS. 1 and 4, with the exception of the symbol (') in FIG. 4, indicate similar items or functions. Series coupled diode D1', inductor L1' and transistor Q2' of FIG. 4 are coupled to a winding W3' which supplies negative going retrace pulses. Winding W3' is also used as a voltage source for a trace rectifier D2', for producing in a capacitor C2' a supply voltage of 28 volts required by, for example, a vertical deflection amplifier, not shown.

The operation of a high voltage regulator circuit 102' is similar to circuit 102 described in FIG. 1. The waveforms in FIGS. 2a-2e with respect to the circuit of FIG. 1 are also applicable with respect to the circuit of FIG. 4 except for the waveform of FIG. 2e which is inverted, as shown in FIG. 4. A difference between control circuit 103' of FIG. 4 and circuit 103 of FIG. 1 is that control circuit 103' of FIG. 4 is controlled directly by a sample of the high voltage charge current in winding W2' instead of directly by ultor voltage U, as shown on FIG. 1. The charge current through winding W2' of FIG. 4 is sampled across a resistor R21 of FIG. 4. A capacitor C8 provides filtering. The charge current through resistor R21 is inverse proportional to high voltage U'. Therefore, the arrangement of FIG. 4 can operate properly in an open loop configuration. The circuit of FIG. 4 may be employed in a high voltage circuit that does not include a bleeder resistor.

A regulation circuit 102" of FIG. 5, embodying an aspect of the invention, provides ultor voltage regulation and operates similarly to that described with respect to the circuit of FIG. 1. In FIG. 5, an E-W raster distortion corrected horizontal deflection circuit 200 is included. Similar symbols and numerals in FIGS. 1 and 5, with the exception of the symbol (") in FIG. 5, indicate similar items or functions.

An E-W switching transistor Q11 of FIG. 5 is conductive and supplies a controllable amount of energy to deflection resonant circuit 79" during a first portion of the retrace interval for obtaining an East-West amplitude modulated deflection current. Horizontal retrace begins when transistor Q1" is turned off. Transistor Q11 is maintained conductive from a time at the beginning of the horizontal trace interval and until a controllable instant during the first portion of horizontal retrace. The retrace, first portion begins at the time transistor Q1" becomes nonconductive. The length of the first portion varies in a vertical rate manner to provide East-West raster distortion correction. Following the retrace, first portion, transistor Q11 becomes nonconductive and isolates a flyback resonant circuit 251, that includes winding W1" and a flyback capacitance CT, from resonant circuit 79". High voltage regulation circuit 102" is also isolated from retrace circuit 79", during a second portion of the retrace interval, when diodes DHV are conductive. As a result, circuit 102" is not by-passed by circuit 79". Therefore, the efficiency of circuit 102" is, advantageously, increased.

The operation of the deflection circuit that includes circuit 79", circuit 200 and circuit 251 is described in more detail in allowed U.S. patent application Ser. No. 722,809, filed Jun. 28, 1991, entitled, RASTER DISTORTION CORRECTION CIRCUIT in the name of Haferl, that is incorporated by reference herein.

What is claimed is:

1. A regulated power supply for a video display apparatus, comprising:
   a retrace resonant circuit that includes a deflection winding;
   a flyback transformer;
   a source of an input supply voltage that is coupled to a first winding of said transformer;
   a source of a synchronization input signal at a frequency that is related to a deflection frequency;

first switching means responsive to said input signal and coupled to said deflection winding and to said transformer for generating a deflection current in said deflection winding, during a deflection cycle, and a first pulse in said first winding of said transformer, during retrace;

a pulse-width-modulator responsive to a control signal for generating a pulse-width-modulated signal that is modulated in accordance with said control signal; and second switching means responsive to said pulse-width-modulated signal and coupled to a second winding of said transformer for generating a second pulse in said second winding, during retrace, that is modulated in accordance with said modulated signal, both said first and second pulses being transformer-coupled to a load circuit via said transformer for generating one of a regulated load voltage and a regulated load current in said load circuit.

2. A power supply according to claim 1 further comprising, an inductance coupled to said second winding to form a current path for producing a current in said second winding having a rate of change, during trace, that is determined by a value of said inductance and that is modulated in accordance with said pulse-width-modulated signal.

3. A power supply according to claim 2 wherein said first switching means applies said input supply voltage across said first winding of said transformer for transformer-coupling said input supply voltage to said second winding, during trace, to develop a trace voltage in said second winding that produces in said inductance said second winding current.

4. A power supply according to claim 3 wherein said second winding is energized entirely via said transformer.

5. A power supply according to claim 2 wherein said second winding current is transformer-coupled to said load circuit, during retrace.

6. A power supply according to claim 1 wherein said first pulse is transformer-coupled to a high voltage winding of said transformer and wherein a rectifier is coupled to said high voltage winding for generating from said first pulse an ultor voltage and a beam current.

7. A power supply according to claim 6 wherein said pulse-width modulator is responsive to one of said ultor voltage and a current that flows in said high voltage winding for regulating said ultor voltage in a feedback manner.

8. A power supply according to claim 1 wherein the modulation of said pulse-width-modulated signal does not affect said deflection current.

9. A power supply according to claim 1 wherein said input supply voltage produces a current in said first winding of said transformer to store magnetic energy in said transformer, during trace, the stored magnetic energy replenishing energy losses in said retrace resonant circuit and in said load circuit, during retrace.

10. A power supply according to claim 1 wherein said pulse-width-modulated signal is modulated, during trace.

11. A power supply according to claim 1 further comprising, an inductance coupled to said second winding of said transformer for conducting in said inductance a ramping, second current having a peak amplitude that is modulated in accordance with a beam current, wherein said second switching means decouples said inductance from said transformer during a first portion of a retrace interval and couples said inductance to said transformer during a second portion of said retrace interval and wherein a length of each of said first and second portions varies in accordance with said beam current.

12. A power supply according to claim 11 wherein said inductance is formed in a current path of said second winding current and is coupled via said transformer to said retrace resonant circuit to vary a retrace resonance frequency of said retrace resonant circuit in accordance with said beam current in a manner to compensate for retrace time modulation that is caused by a variation of said beam current.

13. A power supply according to claim 1 wherein said second switching means comprises a two-terminal rectifier.

14. A power supply according to claim 1 wherein said pulse-width modulator is responsive to one of said load current and voltage for varying a pulse-width of said modulated signal in accordance with one of said load current and voltage.

15. A power supply according to claim 1 wherein said deflection current is regulated in accordance with said input supply voltage and is unaffected by the pulse-width modulation.

16. A regulated power supply for a video display apparatus, comprising:

a retrace resonant circuit that includes a deflection winding;

a flyback transformer;

a source of an input supply voltage that is developed in a first winding of said transformer, during trace;

a source of a synchronization input signal at a frequency that is related to a deflection frequency;

first switching means responsive to said input signal and coupled to said deflection winding and to said transformer for generating a deflection current in said deflection winding, during a deflection cycle, and a first pulse in said first winding of said transformer, during retrace;

an energy storage inductance coupled to a second winding of said transformer, such that said input supply voltage is transformer-coupled from said first winding to said inductance, during trace, to store magnetic energy in said inductance for generating from the stored magnetic energy in said inductance a second pulse in said second winding, during retrace, both said first and second pulses being transformer-coupled to a load circuit via said transformer for generating one of a regulated load voltage and a regulated load current in said load circuit that is regulated in accordance with said second pulse.

* * * * *